United States Patent [19]

Kimura et al.

[11] 4,220,427
[45] Sep. 2, 1980

[54] APPARATUS FOR GUIDING CONTINUOUS CHIP FORMED IN LATHING

[75] Inventors: Keiichi Kimura, Yokohama; Eimei Negishi, Kawasaki, both of Japan

[73] Assignee: Nippon Kogaku K.K., Tokyo, Japan

[21] Appl. No.: 872,156

[22] Filed: Jan. 25, 1978

[30] Foreign Application Priority Data

| Jan. 31, 1977 | [JP] | Japan | 52-9439 |
| Sep. 5, 1977 | [JP] | Japan | 52-105883 |
| Sep. 12, 1977 | [JP] | Japan | 52-108964 |
| Sep. 16, 1977 | [JP] | Japan | 52-110466 |
| Sep. 20, 1977 | [JP] | Japan | 52-112201 |
| Sep. 21, 1977 | [JP] | Japan | 52-112553 |

[51] Int. Cl.² .......................... B26D 1/00; B23B 27/22
[52] U.S. Cl. .......................... 407/3; 407/100; 407/115; 82/34 R
[58] Field of Search .......................... 407/2-6, 407/100, 115; 82/DIG. 2

[56] References Cited

U.S. PATENT DOCUMENTS

| 622,906 | 4/1899 | Watson | 407/100 |
| 1,036,102 | 8/1912 | Hartness | 407/3 |
| 1,130,275 | 3/1915 | Hartness | 82/DIG. 2 |
| 3,126,560 | 3/1964 | Jennings | 407/2 |

*Primary Examiner*—Leonidas Vlachos
*Attorney, Agent, or Firm*—Fitzpatrick, Cella, Harper & Scinto

[57] ABSTRACT

This invention relates to an apparatus for guiding a continuous chip formed in lathing. The apparatus can guide the chip smoothly without jamming caused by, for example, curling of the chip so as to prevent the finished surface of a workpiece from damaging and reduce idle time due to dealing with the jammed chip. The apparatus has a guide member mounted on or integral with a cutting tool. The guide path is provided in the guide member for passing the chip, and the guide path has an inlet in the vicinity of the cutting edge of the cutting tool and an outlet remote from the cutting edge. The guide path is inclined, at its inlet portion, with an angle substantially equal to the flowing direction of the chip. The shape and dimension of the guide path may be varied in accordance with the nature of the chip. A detector may be used for detecting the smooth operation of the continuous chip or for detecting the jamming of the chip around the inlet so as to stop the operation.

9 Claims, 31 Drawing Figures

APPARATUS FOR GUIDING CONTINUOUS CHIP FORMED IN LATHING

BACKGROUND OF THE INVENTION

The present invention relates to an apparatus for disposing of cutting chips of a continuous shape formed in cutting work on a lathe, and particularly to an apparatus for guiding long continuous chips.

The continuous chips formed in lathing have conventionally been broken into small pieces by a chip breaker because such continuous chips tend to cling to the cutting tool or to the work piece, eventually causing damage to the finished faces and requiring much time for removing the clung chips from the cutting tool or the work piece. However, the breaking of such continuous chips into small pieces with a chip breaker has been difficult to achieve in case of finish lathing with a small depth of cut and a small feed rate or in case of lathing of highly ductile metal such as aluminum alloy and stainless steel.

SUMMARY OF THE INVENTION

The object of the present invention, therefore, is to provide an apparatus capable of guiding continuous chips formed in lathing.

The apparatus for guiding continuous chip formed by the cutting tool of a lathe comprises a guide member provided on the cutting tool, the guide member being provided with a passage for the continuous chip. This passage provides an inlet in the vicinity of the cutting tip of the cutting tool and an outlet distanced from the cutting tip, the direction of the passage in the vicinity of the inlet thereof approximately coinciding with the direction of the flow of the continuous chip.

DESCRIPTION OF THE PREFERRED EMBODIMENT

The present invention will be explained in detail with respect to the embodiments thereof.

Figure 1:
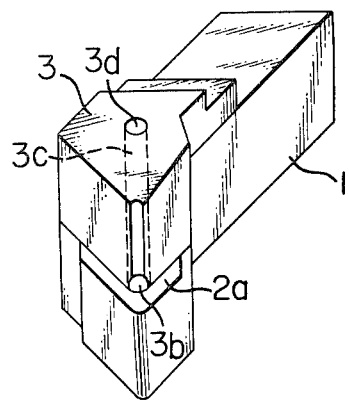
FIG. 1 is a perspective view of a first embodiment of the present invention.
Figure 2:
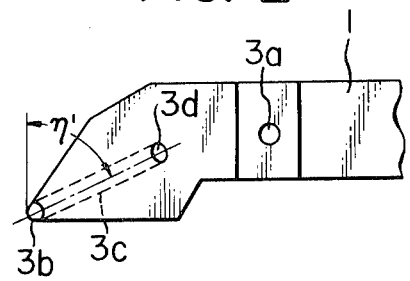
FIGS. 2 and 3 are respectively a plan and lateral view of said first embodiment.
Figure 3:
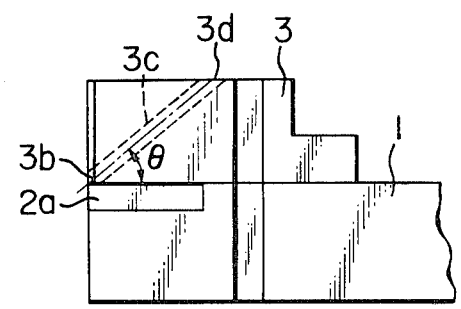
Figure 4:
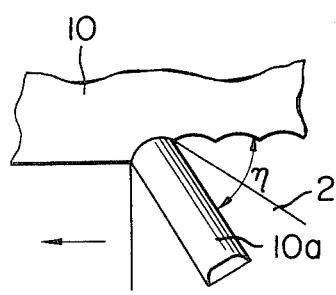
FIG. 4 is an explanatory drawing illustrating the formation of a continuous chip.

Referring to FIGS. 1, 2 and 3 showing perspective and projectional views of a first embodiment of the present invention wherein the chip guiding tool of the present invention is incorporated with a tipped tool, a tip 2a made of a high speed steel or a carbide tip 2a is brazed to a shank 1. A block 3 is fixedly mounted on the upper face of said shank 1 by means of unillustrated fixing screws. A hole 3a shown in FIG. 2 is provided for said screw. Said block 3 is provided with a hole consisting of an inlet 3b, an outlet 3d and a passage 3c extending therebetween. In general, the continuous chip 10a formed in lathing flows out with a chip flow angle η from the work piece 10 and approximately parallel to the rake face of the tip 2a in the vicinity of the cutting edge thereof. Consequently, the continuous chip formed by the tip 2a enters the passage 3c from the inlet 3b thereof and is ejected from the outlet 3d distanced from said tip 2a if said block 3 is mounted on the tip 2a in such a manner that said inlet 3b is located close to the cutting edge of said tip 2a and the angle η' of said passage 3c in the vicinity of the inlet thereof (FIG. 2) is approximately equal to said chip flow angle η. The inclination Θ of said hole 3b, 3c, 3d (FIG. 3) can be freely selected within a range not disturbing the flow of the continuous chip. Also said direction determined by the angle η' of the hole, though being approximately equal to the flow angle of the continuous chip in the vicinity of the inlet 3b, may be changed in other portions of the hole in order to guide the continuous chip to a desirable position. In this manner the hole in the guiding tool prevents the curling of a continuous chip in the hole and guides it to a desired position, thus significantly facilitating the disposal of a continuous chip thereafter.

Figure 5:
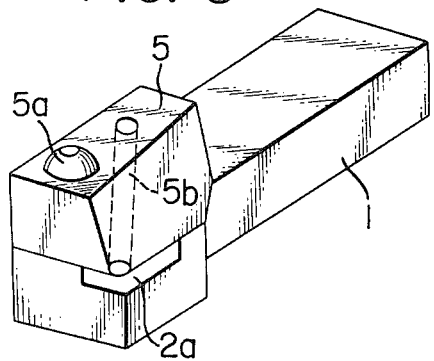

Now there will be given an explanation on a second embodiment of the present invention shown in FIG. 5 in which the chip guiding tool is incorporated with a clamped tool. In FIG. 5, a clamp piece 5 fixes a tip 2a to the shank 1 by means of a clamp screw 5a. In said clamp piece 5 there is provided a chip guiding hole 5b similar to that in the first embodiment and performing the same function as in the first embodiment. Although in these two embodiments the continuous chip is guided through a hole 3b, 3c, 3d; 5b, the present invention is not limited to such guiding holes but also covers other shapes for example a groove as long as they can guide the continuous chip to a desired place while preventing the curling thereof. Furthermore, as is understandable from a fact that the block 3 or the clamp piece 5 in the foregoing embodiments is fixed to the shank 1, such members may be made integral with the shank 1.

Figure 6:
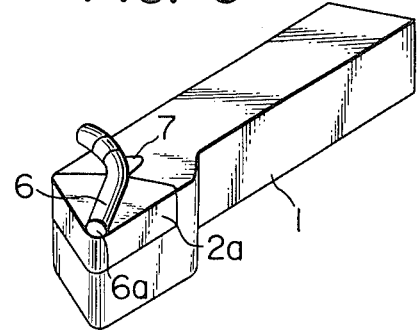
FIGS. 5 and 6 are perspective views, respectively, of a second and third embodiment of the present invention.

Now there will be explained a third embodiment of the present invention referring to FIGS. 6 and 7, wherein the continuous chip is guided by means of a pipe instead of a hole in the foregoing embodiments. In this embodiment a guide pipe 6 is mounted on the shank 1 by means of a mounting member 7 with an inlet 6a positioned close to the cutting edge of the tip 2a. The direction of the guide pipe 6 in the vicinity of the inlet 6a thereof approximately accords with the flow direction of the continuous chip. In this manner the pipe 6 facilitates the disposal of the continuous chip, guiding said chip therethrough. Furthermore, the cross section of the guide passage need not be constant but may be enlarged, for example, toward the outlet thereof in order to facilitate the flow of the continuous chip therethrough.

Figure 8:
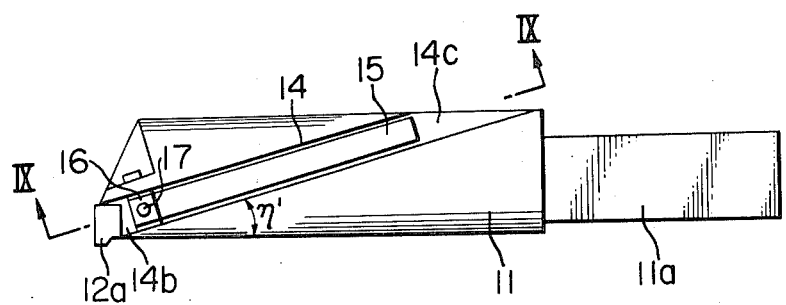
FIG. 8 is a plan view of said fourth embodiment.
Figure 9:
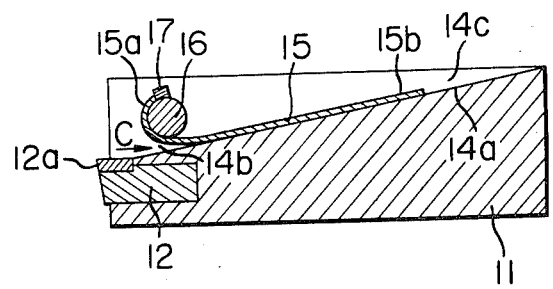
FIG. 9 is a cross-sectional view along the line IX—IX in FIG. 8.

The above-mentioned guiding tools with a passage of a constant cross section may show exhibit difficulty in guiding certain continuous chips. More specifically, the continuous chips often have a tendency to cause curling vertically upwards to the rake face of the cutting tip, and this curl, if excessive, may cause clogging of the continuous chip in the guiding passage. The following fourth embodiment of the present invention, shown in FIGS. 7 to 9, provides a guiding tool capable of securely guiding even the continuous chips showing significant upward curl.

Figure 7:
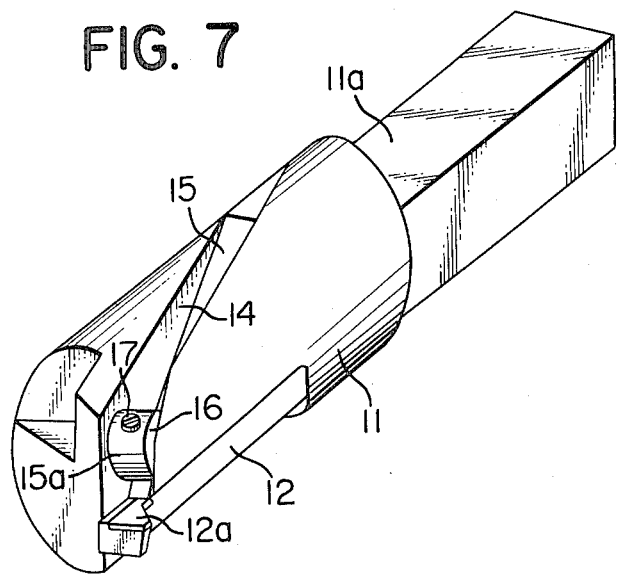
FIG. 7 is a perspective view of a fourth embodiment of the present invention.
Figure 10:
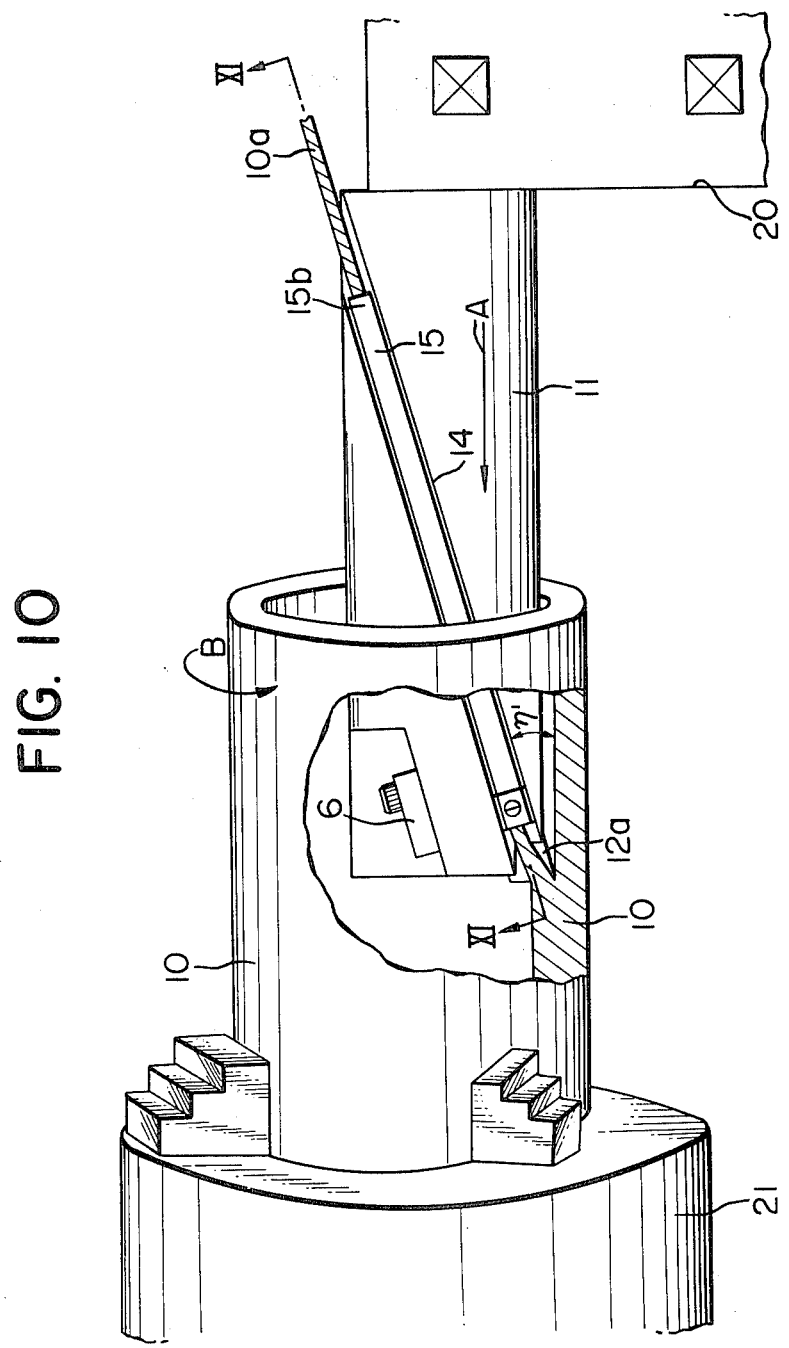
FIG. 10 is a plan view representing the relationship between the chip guiding apparatus of the fourth embodiment and an work piece subjected to boring.

Referring to FIG. 7, a tool holder 11 supports a cutting tool 12 provided with a cutting tip 12a. Said holder 11 is provided with a guide groove 14 of a U-shaped cross section open to the direction of upward curling of the continuous chip formed by the cutting tip 12a, namely open upwards in FIG. 7, said guide groove being provided approximately in the direction of the chip flow angle as shown in FIG. 8. Said guide groove 14 is naturally of a width larger than that of the continuous chip. In FIG. 9, on the upper part of lateral walls of the guide groove 14 there is provided, in the vicinity of the inlet 14b thereof located close to the cutting tip 12a, a support member 16, on which is mounted a plate spring 15 at an end 15a thereof by means of a screw 17 in such a manner that the remaining portion of said plate spring 15 is resiliently pressed against the bottom face 14a of said guide groove 14, said plate spring being of such a length that the other end 15b thereof reaches approximately the outlet 14c of said guide groove 14. In this manner the inlet 14b of the guide groove 14 constitutes a wedge-shaped chip inlet space formed by the plate spring 15 and the bottom face 14a and open toward the tip 12a. FIG. 10 shows a state of boring of a work piece 10 by means of a cutting tool 12 mounted on the chip guiding tool with the plate spring explained above. The holder 11 is fixed, by the mounting part 11a thereof, on a tool post 20 of the lathe and is advanced in a direction represented by the arrow A. The work piece 10 is mounted on a chuck 21 and rotated in a direction represented by the arrow B. In FIG. 10, the work piece 10 is illustrated partly broken in order to clarify the state of cutting.

Figure 11:
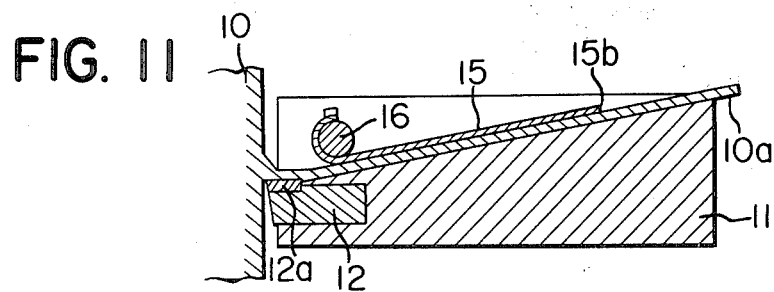
FIG. 11 is a cross-sectional view along the line XI—XI in FIG. 10.

Now there will be explained how the continuous chip is guided in the groove 14 of the guiding tool. Referring to FIG. 9, the continuous chip formed by the cutting tip 12a flows in the direction of arrow C and enters, from the groove inlet 14b, the space between the plate spring 15 and the bottom face 14a, lifting said plate spring. As the upward curl of the chip is prevented by the downward biasing force of the plate spring 15, the continuous chip 10a flows along between said plate spring 14 and the bottom face 14a and flows out from the other end 15b of said plate spring as shown in FIG. 10 and FIG. 11 which is a cross sectional view along the line XI—XI in FIG. 10. In this manner the continuous chip 10a, despite of curling tendency thereof, can be guided to a desired place well distanced from the cutting tip 12a. Although the guide groove 14 is constructed in a straight shape substantially coinciding with the direction of flow of the continuous chip in the present embodiment, it is to be noted that said groove 14 need not necessarily coincide with said direction of flow but may be directed toward a place convenient for the disposal of the continuous chip as long as the groove 14 is directed in the vicinity of the inlet 14b thereof along said direction of flow.

Figure 12:
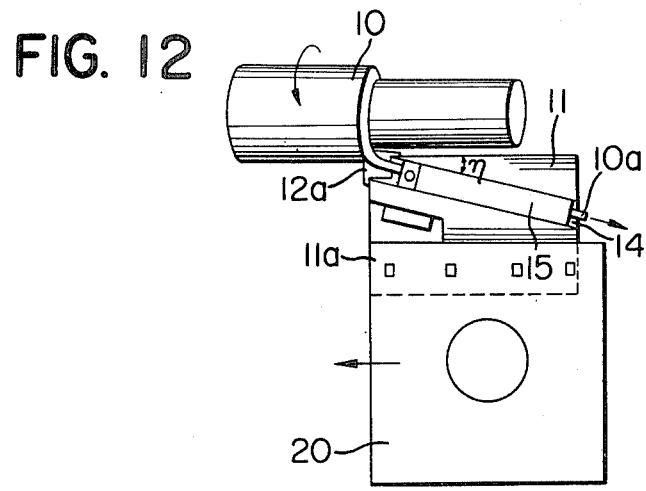
FIG. 12 is a drawing similar to FIG. 10 but showing turning.

FIG. 12 shows the relationship between the guide tool and the work piece in case of turning, namely, lathing an external periphery of the work piece. The tool holder 11 provided with a chip guiding groove 14 and a plate spring 15 is fixedly mounted on a tool post 20, and the continuous chip 10a is guided in the guide groove 14 while being pressed by the plate spring 15. In this case the mounting part 11a of the chip guiding tool 11 is provided at a side of the main body thereof.

Figure 13:
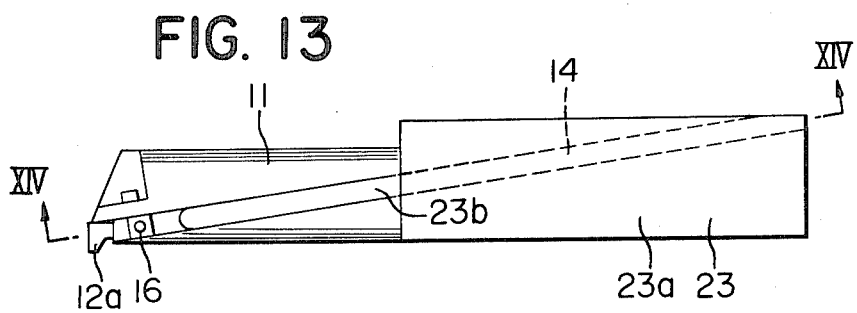
FIG. 13 is a plan view of a fifth embodiment of the present invention.
Figure 14:
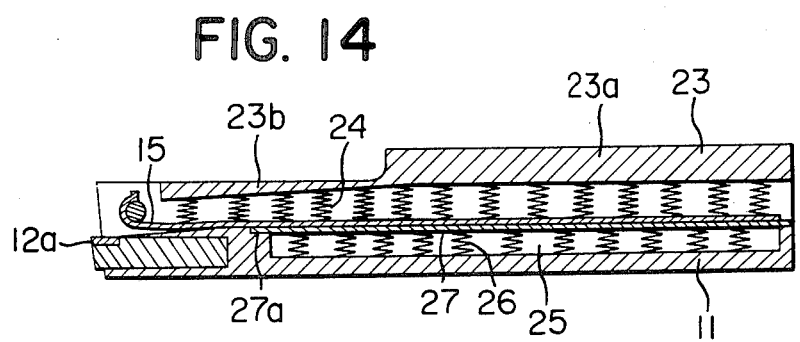
FIG. 14 is a cross-sectional view along the line XIV—XIV in FIG. 13.

FIGS. 13 and 14 show a fifth embodiment of the present invention wherein the guide groove is further extended than in the foregoing fourth embodiment. In this case it becomes necessary to reinforce the biasing force of the plate spring 15 as it is elongated corresponding to the increased length of the groove 14 as shown in FIG. 14. For this purpose there are provided, on the holder 11, a cover 23 and plural compression springs 24. Said cover 23 is composed of a main body portion 23a covering the rear portion of the holder 11 and a protruding portion 23b engaging with the front portion of the guide groove 14, and said compression springs 24 are provided between said protruding portion 23b and main body portion 23a and the plate spring 15 to provide a biasing force in a direction opposite to the upward curling of the continuous chip, namely a downward biasing force in the illustration.

Furthermore the guide groove in said holder 11 is provided, on the bottom face thereof, with recess 25 to receive plural compression springs 26 supporting an another plate 27 in facing relationship with said plate spring 15. Said plate spring 27 is fixed, at an end 27a thereof, to the holder 11 so as to be on the same level with the bottom face of the guide groove at the inlet portion thereof. Consequently the continuous chip is guided to the outlet of the guide groove between two plate springs 15 and 27. In this embodiment the presence of the plate spring 27 allows the deformation of the continuous chip even to a direction opposite to the curling thereof, namely downward in the drawing so that even a continuous chip with intense curling can be guided over a long distance.

Figure 15:
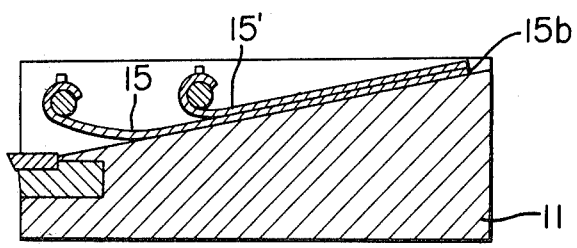
FIG. 15 is a cross-sectional view of a sixth embodiment of the present invention.

Also in the sixth embodiment shown in FIG. 15, there is provided another plate spring 15' which is superposed on the same plate spring 15 as in the foregoing embodiments from the middle portion to the free end 15b thereof thereby reinforcing the biasing force in the rear portion of said plate spring 15.

In case of lathing stainless steel or carbon steel, a satisfactory guiding function may not be achieved by the above-explained guiding tools for the continuous chips resulting from such materials since such continuous chips tend to cause a lateral curl along the rake face of the cutting tip. Also a similar difficulty in guiding may be encountered even in a material such as aluminum because of such lateral curl which will occur if the depth of cut is as small as for example 1-1.5 mm in diameter.

Figure 17:
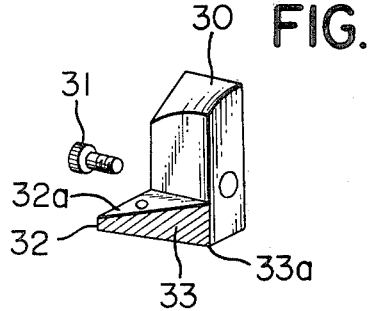
FIG. 17 is a perspective view of a lateral curl blocking member.
Figure 16:
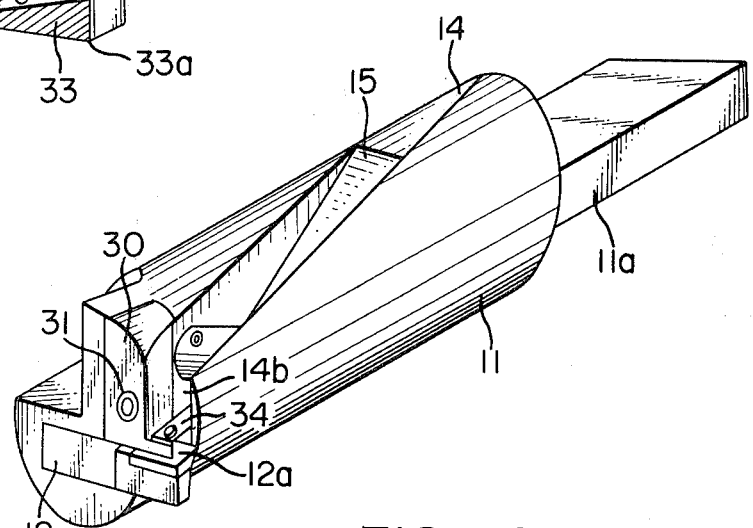
FIG. 16 is a perspective view of a seventh embodiment of the present invention.
Figure 18:
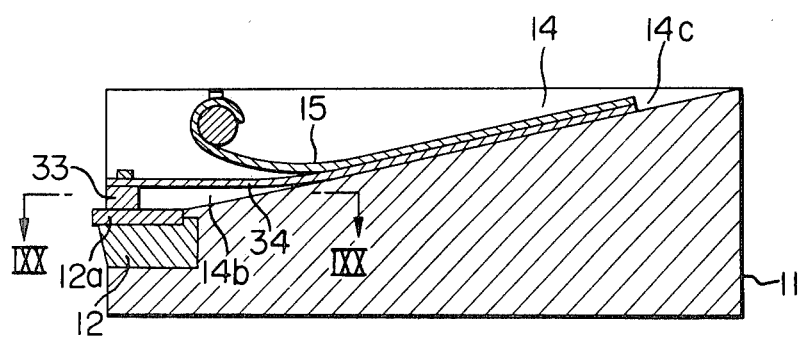
FIG. 18 is a cross-sectional view along the guide groove of said seventh embodiment.

Now there will be given an explanation, therefore, on the seventh embodiment of the present invention, shown in FIG. 16, which is improved so as to securely guide even a continuous chip with a laterally curling tendency. For simplicity, the description of the seventh embodiment will be limited to such improved parts. Referring to FIG. 16, there is provided a lateral curl blocking member 30 which is mounted, by means of a screw 31, on a side wall of the inlet portion 14b of the guide groove 14. As shown in FIG. 17, said blocking member 30 is provided with a projecting portion 32 of which side wall 33 functions as a lateral curl blocking wall. On the upper face 32a of said projecting portion 32, as shown in FIGS. 16, 17 and 18, there is provided a plate spring 34 which is similar to the aforementioned plate spring 15 and which is extended into the guide groove 14 and inserted between the plate spring 15 and the bottom face of the groove. Now referring to FIG. 19 which is a cross sectional view along the line IXX—IXX in FIG. 18 representing the positional relationship between said lateral curl blocking wall 33 and the guide groove 14, the blocking member 30 is positioned above the tip 12a in such a manner that the blocking wall 33 thereof protrudes into the extention of the guide groove 14 with a certain angle thereto, an end 33a of the wall 33 is smoothly connected to the end of one of side walls of the guide groove 14 and that the other end is positioned close to the cutting edge of the tip 12a.

Figure 19:
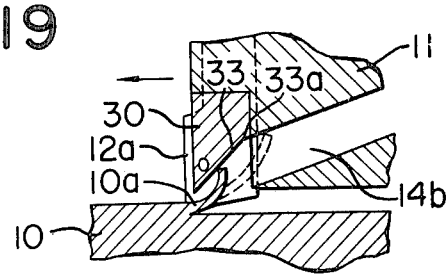
FIG. 19 is a cross-sectional view along the line IXX—IXX in FIG. 18.

Thus, when the cutting tool 12 is advanced in the direction of the arrow as shown in FIG. 19, the chip 10a from the work piece 10 engages immediately with the blocking wall 33 thereby being prevented from forming a lateral curl along the rake face of the tip, and is advanced along the blocking wall and led to the inlet 14b of the guide groove 14 as shown by the broken lines as the cutting tip 12a is further advanced. Also an upward curl vertical to said rake face is prevented by the second plate spring 34. The continuous chip 10a led into the inlet 14b by the blocking wall 33 is guided between the bottom face of the guide groove 14 and said plate spring 34 and is ejected from the outlet 14c. In this case the first plate spring 15 functions to reinforce the biasing force of the second plate spring 34 in the rear portion thereof.

Figure 20:
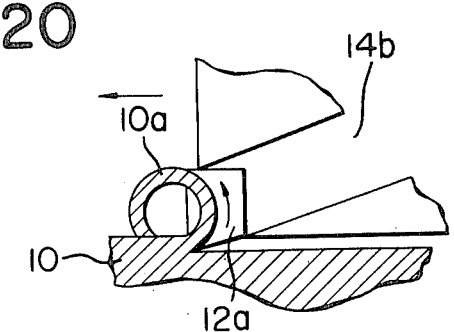
FIG. 20 is a partial cross-sectional view illustrating the state of continuous chip in the absence of lateral curl blocking member of the seventh embodiment.

As explained above, the function of the blocking wall 33 lies in preventing the lateral curl of the continuous chip 10a and leading it to the inlet 14b of the guide groove. Without said blocking wall 33, the continuous chip would cause a lateral curl as shown in FIG. 20 and would not be led into the guide groove 14.

The width of the guide groove at the inlet thereof is determined according to the material to be handled and the cutting conditions such as depth of cut. It is however not economical to prepare plural guiding tools with different guide groove widths according to the material or other cutting conditions.

Figure 21:
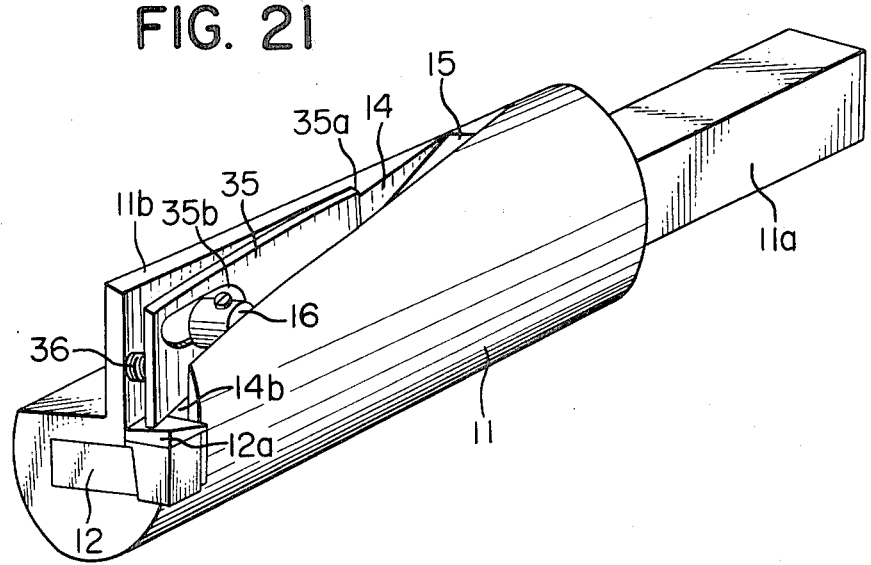
FIG. 21 is a perspective view of an eighth embodiment of the present invention.
Figure 22:
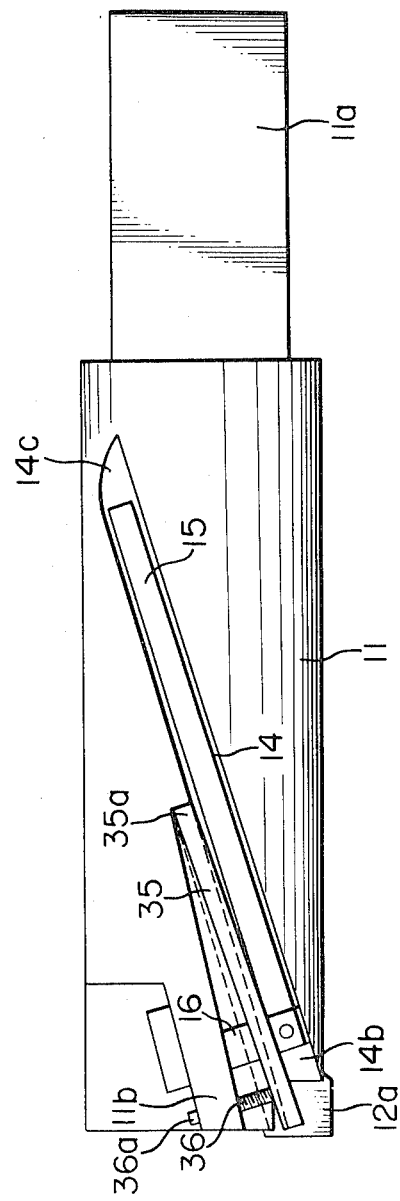
FIG. 22 is a plan view of said eighth embodiment.

For this reason, the eighth embodiment of the present invention shown in FIGS. 21 and 22 provides a structure wherein the groove width is variable at least in the inlet portion thereof. Referring to FIG. 21, a part of a side wall of the guide groove 14, in the vicinity of the inlet thereof, is composed of variable guide wall 35 made of an elastic material, said wall being fixed to the tool holder 11 at the end 35a located remote from the inlet of the groove 14. Also as shown in FIG. 22, said side wall 35 is supported, at a side face in the vicinity of the other end thereof, by an end of a guide wall displacing screw 36. Since the screw 36 engages with a female screw provided on the front wall 11b of the holder 11, rotation of the screw by the other end 36a allows displacement of the guide wall 35 by the elastic deformation as illustrated by the broken line thereby varying the width of the inlet portion 14b of the guide groove 14.

Also as shown in FIG. 21, the guide wall 35 is further provided with a laterally oblong hole 35b for passing the spring mounting member 16 in such a manner that the lateral diameter of said hole is satisfactorily larger than that of said spring mounting member 16 in order to avoid eventual interference thereof with said hole 35b upon displacement of said guide wall 35.

With this structure it is rendered possible to displace said variable guide wall 35 so as to enlarge the inlet width of the groove for accommodating the continuous chips of a larger width obtained in case of a large depth of cut, or to reduce the groove width in case of a small cutting depth in order to prevent the aforementioned lateral curl of the chip by letting the chip engage with the variable guide wall 35 in the inlet portion 14b before such curl is formed.

Naturally it is also possible to render one entire side wall of the guide groove displaceable in order to adjust the groove width.

Figure 23:
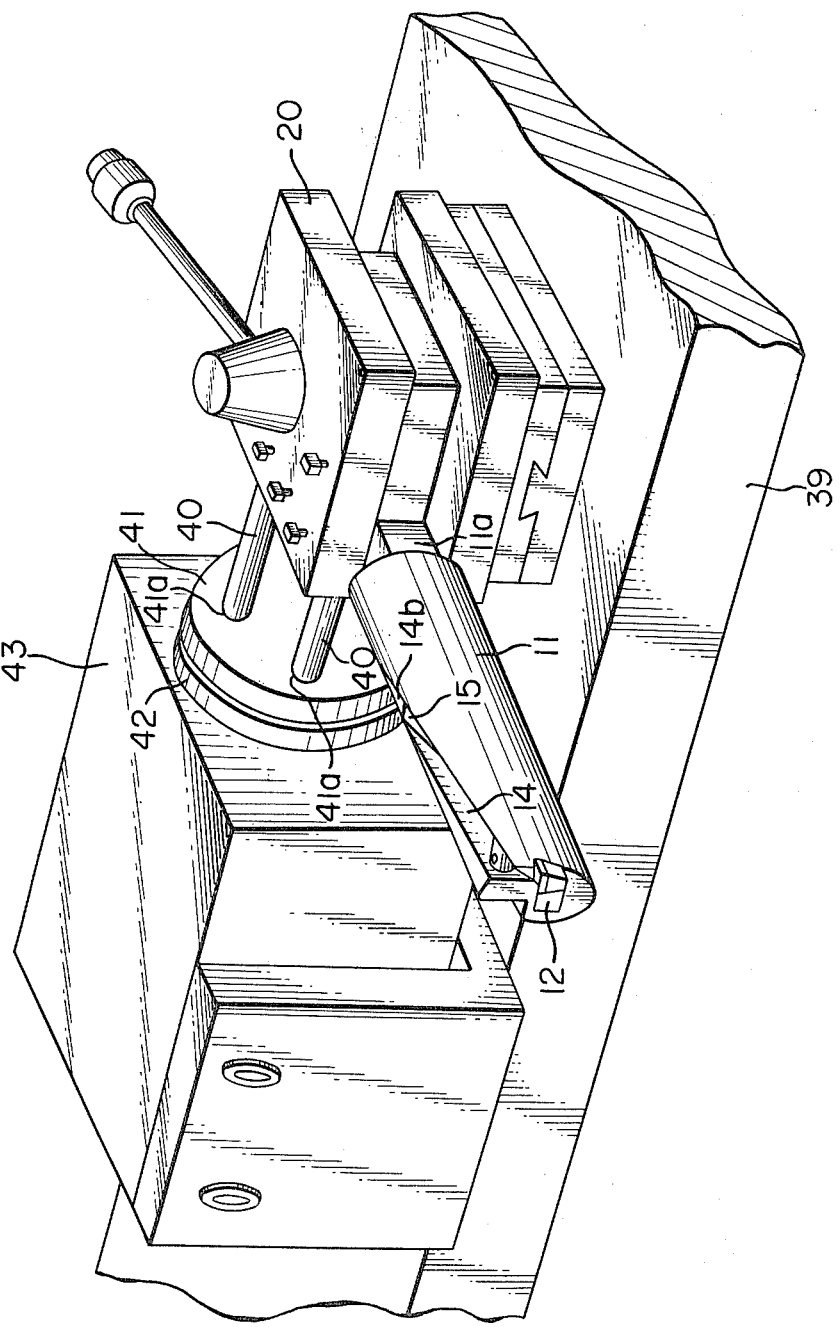
FIG. 23 is a perspective view of a ninth embodiment of the present invention.
Figure 24:
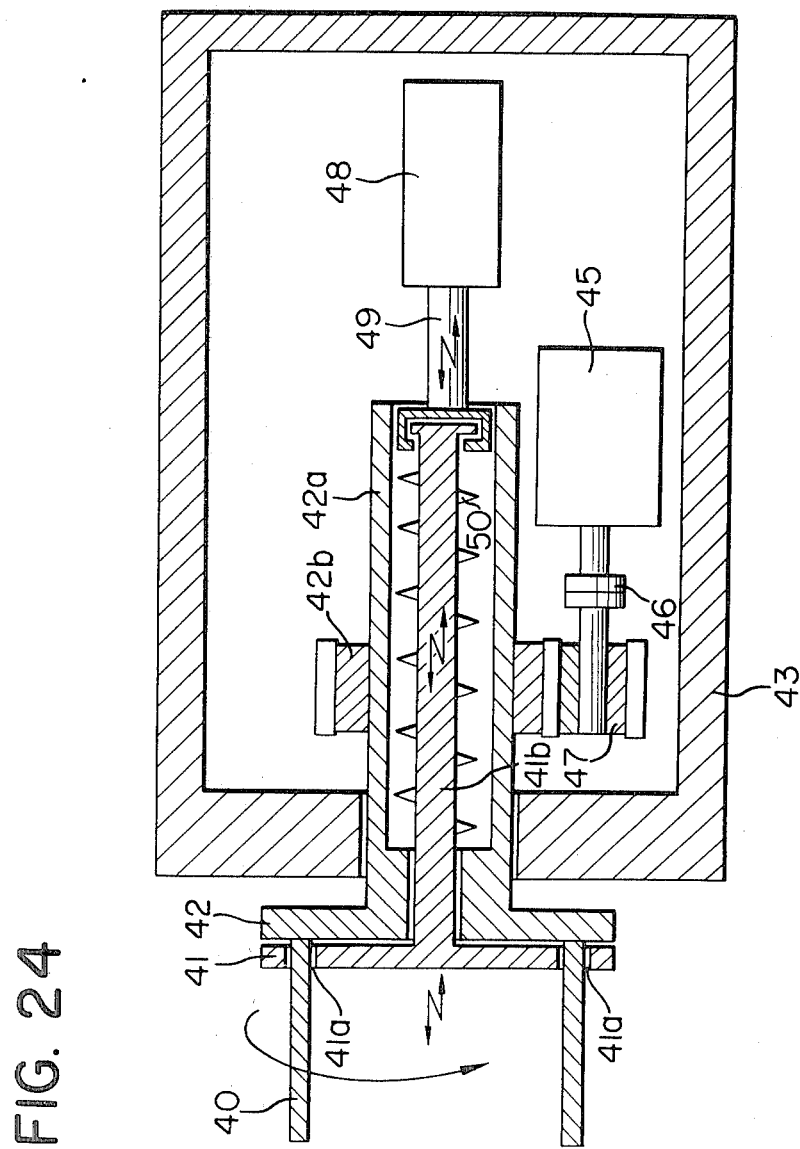
FIG. 24 is a cross-sectional view of certain components in the ninth embodiment.

Now there will be explained the ninth embodiment of the present invention disposing of the continuous chip guided to a determined place by means of the aforementioned guiding tool. Referring to FIG. 23, a holder 11 identical with that shown in FIG. 7 is mounted, by means of the mounting portion 11a thereof, on a tool post 20 which is supported on a lathe carriage 39. Also on the extention of the guide groove 14 beyond the outlet 14c thereof there are provided four chip take-up rods 40 which pass through four corresponding holes 41a of a disc 41 and are fixedly mounted on a mounting disc 42 provided therebehind. Said rods are driven by a drive system accommodated in a housing 43 which is mounted on the lathe carriage 39 and of which interior is shown in FIG. 24. Now referring to this drawing, a cylindrical member 42a formed integral with said mounting disc 42 is rotatably supported in said casing 43 and is provided on a part thereof with a gear 42b which engages with an another gear 47 connected to the drive shaft of a motor 45 through a friction coupling 46.

A shaft 41b formed integral with the aforementioned disc 41 extends into said cylindrical member 42a and is axially slidably supported by said member 42a. The free end of said shaft 41b is connected to a rod 49 of an air cylinder 48 so as to be rotatable relative thereto and axially to reciprocate therewith. Said shaft 41b is biased toward the right (as viewed) by means of a compression spring 50 provided in said cylindrical member 42a whereby said disc 41 remains normally in contact with the mounting disc 42 so as to leave said rods 40 protruding from said disc 41.

Figure 25:
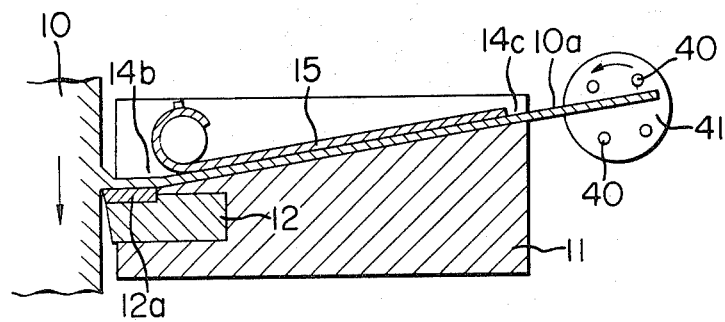
FIG. 25 is a cross-sectional view along the guide groove of the ninth embodiment.

As shown in FIG. 25, the continuous chip 10a flowing out from the outlet 14c enters between and is taken up around said rods 40 which are placed under rotating motion by means of the motor 45 through the friction coupling 46, gears 47 and 42b, and mounting disc 42. Said friction coupling 46 performs a function of enabling chip take-up with a substantially constant tension regardless of the variation in the flow speed of the chip 10a from the outlet 14c or of the increase of winding diameter around said take-up rods.

Since the continuous chip guiding tool and the housing 43 are both mounted on the lathe carriage 39, the mutual positional relationship between the guide groove 14 and the take-up rods 40 is maintained constant even when the carriage 39 is displaced to advance the cutting tool 12, thus allowing secure take-up of the continuous chip 10a even during such advancement of the tool 12.

In order to remove the taken-up chip from the take-up rods 40, the air cylinder 48 in FIG. 24 is pressurized to displace the shaft 41b through the rod 48 against the pressure of compression spring 50. Accordingly the disc 41 is likewise displaced to the left (as viewed) to expel the chip 10a wound around said take-up rods 40. After chip removal in this manner, air is released from the air cylinder 48 whereby the disc 41 returns to the original position shown in the drawing by the pressure of the spring 50.

Figure 26:
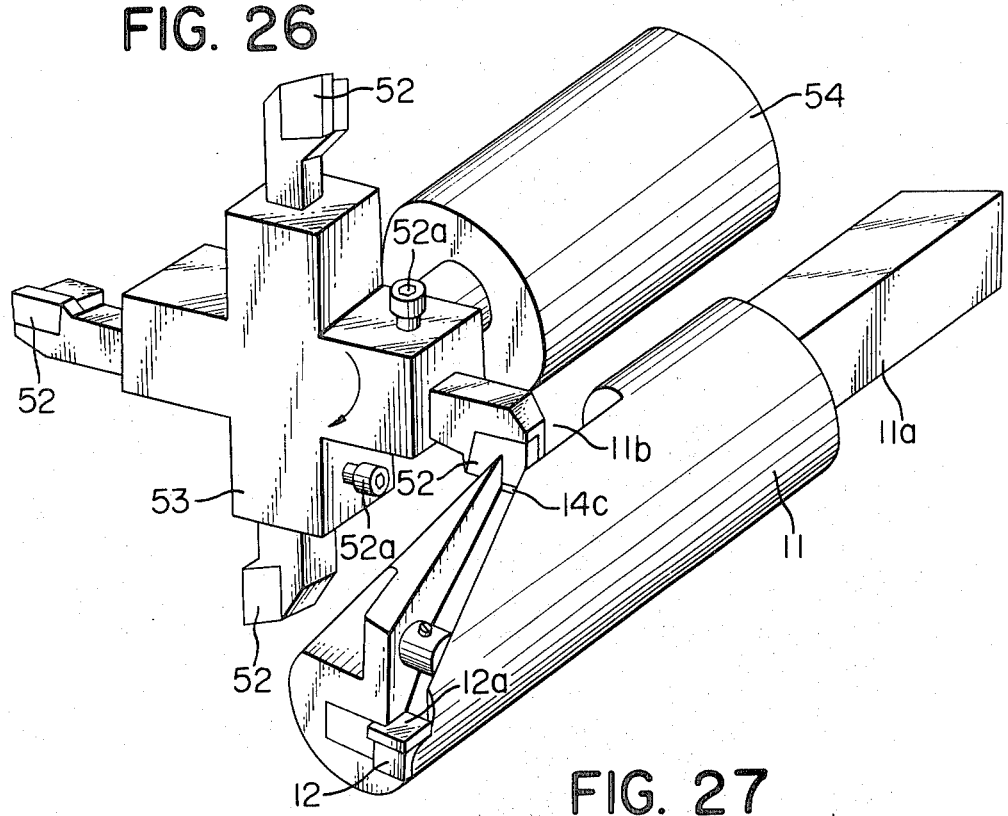
FIG. 26 is a perspective view of a tenth embodiment of the present invention.

In the tenth embodiment of the present invention shown in FIG. 26, there are provided four cutters 52 mounted by screws 52a on a mounting member 53 which is rotated by a motor 54 in the direction of the arrow.

By the rotation of said motor 54, said cutters 52 rotate and pass in a recess 11b provided in the tool holder 11 behind the outlet 14c of the guide groove 14 and move in the close vicinity of the end face 14d (FIG. 27) of said outlet 14c of said groove 14. As in the ninth embodiment, the tool holder 11 and the motor 54 are both mounted on the lathe carriage (not shown).

Figure 27:
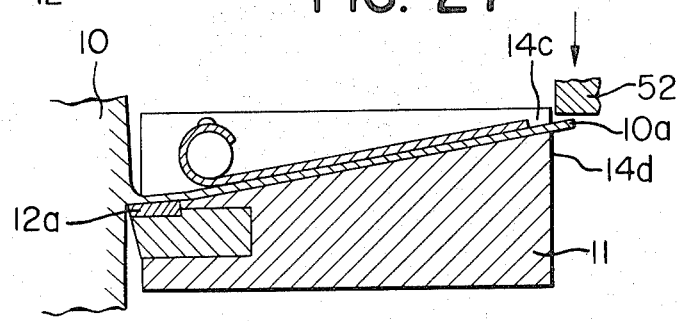
FIG. 27 is a cross-sectional view along the guide groove of the tenth embodiment.

In this manner, the continuous chip 10a flowing out from the outlet 14c is cut, namely shorn, by said rotating cutters 52 and the end face 14d of the guide groove 14 as shown in FIG. 27. The length of the thus chopped chip, being determined by the flowing speed of the continuous chip 10a, the rotating speed of the motor 54 and the number of cutters 52, can be suitably selected for further disposal.

Figure 28:
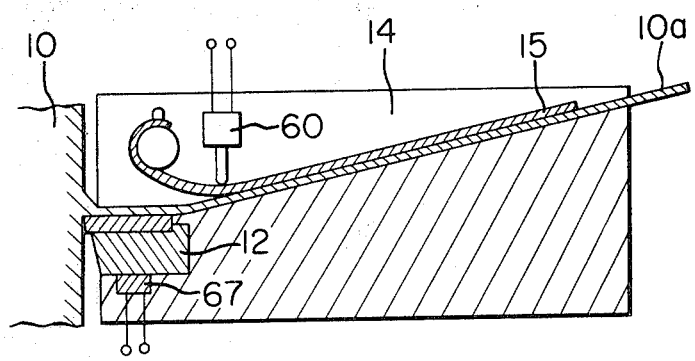
FIG. 28 is a cross-sectional view of an eleventh embodiment of the present invention representing a properly guided continuous chip.
Figure 29:
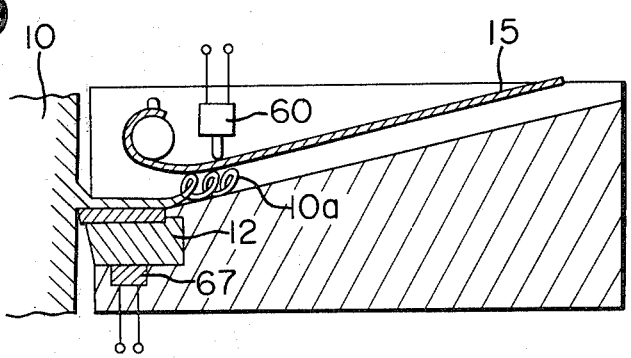
FIG. 29 is a drawing similar to FIG. 28 representing a jammed continuous chip.
Figure 30:
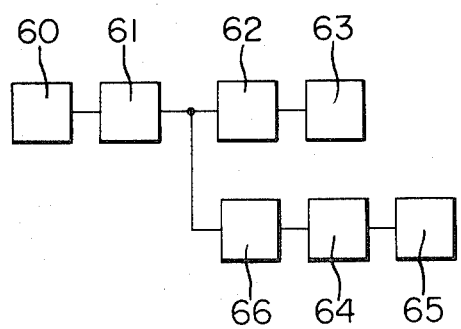
FIG. 30 is a block diagram of a device for detecting the start and termination of chip and the jamming thereof.
Figure 31:
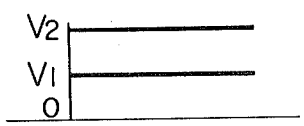
FIG. 31 is a drawing indicating the output levels of the circuit 61 in FIG. 30.

In the foregoing embodiments, the continuous chip may not be properly guided by the guiding tool but retained in the vicinity of the inlet thereof if the lathing is operated under conditions not adapted for the guiding tool used. The eleventh embodiment of the present invention explained in the following is provided with a device for automatic early detection of such trouble. Referring to FIG. 28, there is mounted, on a side wall of the guide groove 14, a displacement detector 60 capable of detecting the displacement of the plate spring 15. Said detector 60 is composed, in this case, of a differential transformer which is capable of detecting three states, i.e. (1) a state wherein the plate spring 15 is in direct contact with the groove bottom before starting the lathing, (2) a state wherein a continuous chip is guided between the plate spring 15 and the groove bottom whereby the plate spring is correspondingly lifted as shown in FIG. 28, and (3) a state wherein the continuous chip is not guided but retained in the vicinity of the groove inlet whereby the plate spring 15 is significantly lifted as shown in FIG. 29. As shown in FIG. 30, the output of said differential transformer 60 is converted into a DC signal by means of a circuit 61 for example composed of a synchronous rectifier and a smoothing circuit. As shown in FIG. 31, said circuit 61 thus provides an output O corresponding to the state (1) before the start of lathing, an output V1 corresponding to the state (2) with proper chip guiding, or an output V2 (V2>V1) corresponding to the state (3) with chip jamming. A comparator 62 having a reference signal of an intermediate level between said levels V1 and V2 compares the output signal level of said circuit 61 with said reference level and produces an output signal when the output signal from said circuit 61 is larger, namely when the differential transformer 60 detects chip jamming. The output signal from said comparator 62 causes the drive system 63 to interrupt the lathing operation for example by stopping the feed mechanism of the lathe. It is naturally desirable, simultaneously with said interruption of the lathing operation, to function an alarm device informing the operator of the chip jamming.

Now there will be explained, with reference to FIG. 30, a device for performing automatic start and/or stop of the aforementioned chip take-up or cutting device in response to the detection of the start and termination of the formation of the continuous chip. Upon start of the lathing operation and entering of the continuous chip into the guide groove, said circuit 61 generates an output signal V1 as explained in the foregoing, and, upon receipt of said output signal level V1, a switching circuit 64 activates a curcuit 65 for energizing the motor 45 or 54 in FIG. 24 or 26 thereby automatically starting the chip take-up or cutting device. It is preferable to insert a delay circuit 66 between the circuits 61 and 64 to suitably adjust the time until the start of the motor after chip detection particularly in case particularly of the chip the take-up device wherein the start of take-up rods 40 after the insertion of the leading end of the chip therebetween, is desirable for secure take-up operation. Upon completion of the lathing and termination of chip formation, the continuous chip is completely taken up on the take-up device, whereby the circuit 61 gives a 0 output to the circuit 64 to inactivate the circuit 65, thus automatically stopping the motor 45. In case of chip cutting device, the chip formed directly before the completion of the lathing will remain in the guide groove, and the motor will be stopped upon manual removal of the remaining chip by the operator. In order to achieve automatic stop, also in the case of such cutting device, the means 60 of detecting the displacement of the plate spring 15 is preferably replaced by a piezoelectric element 67 for detecting the formation of the continuous chip as shown in FIGS. 28 and 29. Said piezoelectric element 67 detects the cutting force applied to the cutting tool during the lathing, and thus allows secure detection of the start and termination of lathing. Also said piezoelectric element is capable of detecting chip jamming as the force applied to the cutting tool will be significantly increased in case the continuous chip is retained in the inlet portion of the guide groove as shown in FIG. 29.

Also the output of the aforementioned differential transformer 60 or piezoelectric element 67 may be used for the control of an electromagnetic clutch provided on the drive shaft of said motor instead of for direct control of the motor 45 or 54.

Furthermore, for the purpose of detecting the formation of the continuous chip as mentioned above, there may also be utilized other detecting means for example a photoelectric detector.

Although in the foregoing explanation the groove width is constant throughout the entire length thereof, the present invention is not limited to such embodiments but also covers the case wherein the width is variable along the groove. For example a guide groove, which is wider at the inlet portion and narrower at the outlet portion, is convenient for guiding continuous chips with little tendency of lateral curling, since the wider inlet facilitates the introduction of the continuous chip into the groove and the smaller outlet portion suppresses the positional fluctuation of the chip flowing out from the outlet thereby assuring the take-up or cutting of the chip.

We claim:

1. Apparatus for guiding a continuous chip formed by the cutting tool of a lathe to a determined position, said cutting tool being provided with a rake face, said apparatus comprising: a tool holder, a guide member adapted to be supported on said tool holder and provided with means for guiding said continuous chip, said guiding means being provided with an inlet in the vicinity of the cutting edge of said cutting tool and with an outlet, the direction of said guiding means in the vicinity of the inlet thereof coinciding approximately with the direction of flow of said continuous chip, said guiding means comprising a groove open upwardly perpendicularly to the rake face of the cutting tool, and a resilient member disposed along said groove to cover the bottom face thereof in a manner to allow passage of a chip between said resilient member and said bottom face, said resilient member being biased toward said bottom face to prevent said chip from curling vertically upwardly.

2. An apparatus for guiding continuous chip according to claim 1 wherein said resilient member is a plate spring, and the space between said plate spring and the bottom face of said groove in the vicinity of the inlet thereof is wedge-shaped open toward the place where said continuous chip is formed.

3. An apparatus for guiding continuous chip according to claim 2 wherein said plate spring is fixed at one end thereof to the side walls of said guide groove at a point sufficiently distanced from the bottom face thereof and contact in the middle portion with said bottom face to form said wedge-shaped space.

4. An apparatus for guiding continuous chip according to claim 3 wherein said guide member further comprises a spring means for reinforcing the biasing force of said plate spring in the vicinity of the other end thereof.

5. An apparatus for guiding continuous chip according to claim 1 wherein said guiding means includes a blocking member for preventing the lateral curling of the continuous chip in a direction approximately parallel to the rake face of said cutting tip, said blocking member being provided with a curl blocking wall which is connected at one end thereof to a side wall of said groove located in the direction of said lateral curl in such a manner to cross the extension of said groove extended from the inlet thereof and is located at the other end thereof in the vicinity of the cutting edge of said cutting tool, whereby the leading end of the continuous chip formed by said cutting tool comes into contact with said curl blocking wall before forming a curl and is guided along said curl blocking wall toward the inlet of said groove without lateral curling.

6. An apparatus for guiding continuous chip according to claim 5 wherein said resilient member is adapted to extend from above said curl blocking wall to the interior of said guide groove.

7. An apparatus for guiding continuous chip according to claim 1 wherein at least a side wall of said guide groove is displaceable at least in a part close to the inlet thereof in the width direction of said groove in order to adjust the width of said groove in the vicinity of the inlet thereof.

8. An apparatus for guiding continuous chip according to claim 1 further comprising retained-chip detecting means adapted for detecting the presence of a continuous chip not guided by said guide groove but retained in the vicinity of the inlet thereof.

9. An apparatus for guiding a continuous chip, comprising:
a cutting tool provided with a rake face for forming a continuous chip;
a guide member including a guide groove open upwardly perpendicularly to said rake face of said cutting tool; said guide groove being provided with an inlet in the vicinity of cutting edge of said cutting tool and an outlet remote from said cutting edge, the direction of said groove in the vicinity of said inlet thereof coinciding approximately with the direction of flow of said continuous chip; and
a resilient member provided along said guide groove to cover the bottom face thereof in a manner to allow passage of said continuous chip between said resilient member and said bottom face, said resilient member being biased toward said bottom face to prevent curling of said continuous chip toward said upward vertical direction.

* * * * *

UNITED STATES PATENT AND TRADEMARK OFFICE
CERTIFICATE OF CORRECTION

PATENT NO. : 4,220,427
DATED : September 2, 1980
INVENTOR(S) : KEIICHI KIMURA, et al.

It is certified that error appears in the above-identified patent and that said Letters Patent are hereby corrected as shown below:

Column 3, line 37, delete "show"

Signed and Sealed this

Seventeenth Day of March 1981

[SEAL]

Attest:

RENE D. TEGTMEYER

Attesting Officer

Acting Commissioner of Patents and Trademarks